Patented Dec. 22, 1936

2,064,876

UNITED STATES PATENT OFFICE

2,064,876

AIR DRYING COMPOSITION OF THE UREA RESIN TYPE

Howard L. Bender, Bloomfield, N. J., assignor to Bakelite Corporation, New York, N. Y., a corporation of Delaware No Drawing. Application July 11, 1933, Serial No. 679,992

4 Claims. (Cl. 134—26)

This invention relates to synthetic resinous compositions that are primarily intended for use as coatings or impregnations and have the property of drying in air to commercially usable films for the protection of structural parts, car bodies, implements, etc. from atmospheric effects, where the conditions of use or application are such that an after-heating or baking of the films is impractical or impossible.

The synthetic resinous compositions with which this invention is concerned are differentiated from natural or other resins by an initial or potentially reactive or soluble and fusible A stage and gradually convertible or hardenable by heat to a final infusible insoluble or C stage. These resinous compositions include the phenolic aldehyde, the glycerol-polybasic and the urea or thio-urea-aldehyde products; and to distinguish them from the permanently fusible soluble resins, the term resinoid has been adopted and is so used herein.

In a prior application Serial No. 636,955 filed October 8, 1932, now U. S. Patent 1,922,272, there are more particularly described and claimed resinoid compositions of the phenolic type. The present application, which is a continuation-in-part of the above mentioned application, is specifically directed to resinoids of the amino-aldehyde or urea type. Varnishes prepared therefrom deposit films or coatings which, upon evaporation of the volatile content, are non-tacky, adhere firmly to the base material and have a pleasing homogeneous translucent appearance; furthermore, the films or coatings show a marked resistance to sunlight, water penetration and weak alkaline or soap solutions. An additional characteristic of these varnishes and of manifest importance is the comparative ready release of sufficient solvents from the film forming body with the consequence that a film dries to a non-tacky condition in a surprisingly short period of time.

In order that the present invention may be fully disclosed, a specific example relating to the preparation of varnishes follows, but it is to be understood that the conditions and proportions are illustrative only and are subject to change commensurate in scope with the appended claims.

*Example.*—As an illustration of the invention 60 parts of urea or 1 mol is reacted with 60 parts of formaldehyde or 1½ to 2½ mols in solid form or in solution, in the presence of ½ part of hexamethylenetetramine. The reaction is carried on gently for about 5 minutes and then 50 parts of a solvent such as ethylene glycol, or other known medium or high boiling solvent, is added together with 1 part of citric acid. This mixture is heated almost to the gel point. Before the gel point is reached a volatile solvent such as acetone is added in proportion to give a 50% solution. This solution is refluxed to a viscosity of 500 centipoises or more measured in a 50 per cent solution. When it is intended to store the varnish for a period longer than a month for use it is neutralized to a pH ranging from 5 to 6. When films of greater hardness without baking them are desired, a hardening agent preferably one that is slow acting such as triethyl citrate can be added.

Thiourea, substituted ureas, toluene sulfonamids, monoamids like acetamids, or in general unsaturated nitrogen compounds such as nitriles, compounds which change by heat to the amides as ammonium sulfocyanate and anhydrides of amides, such as dicyandiamide, may be substituted in whole or in part for the urea. Other aldehydes may be used in place of formaldehyde.

In the step of refluxing the resinoid while dissolved in ethylene glycol or other known suitable solvent there is an advancement of the resinoid toward a hardened or polymerized condition indicated by a liquid condition when hot and a gelling of a sample when cold. The further refluxing in the presence of a volatile solvent causes additional polymerization or hardening as is shown by the increase in viscosity.

The extent of advancement or degree of polymerization of the resinoid found desirable has no well defined critical limits except that gelling of the mass as a whole is to be avoided. In general the viscosity at 500 centipoises in the finished varnish when adjusted to a 50 per cent solid content is indicative of sufficient advancement to insure the deposition of a film having requisite toughness and durability upon drying in air. Such a varnish shows substantially no penetration when applied to kraft paper of 5 mils thickness. Since the resinoid in the reacted or advanced condition is insoluble for all practical purposes in a solvent such as acetone, the advancement in such a solvent results largely in a colloidal suspension or dispersion, the extent of which is manifested by the lack of penetration. This colloidal condition is further evidenced by the fact that, although the solvent and the contained resinoid when sufficiently advanced by heating may have the appearance of a true solution, further additions of the same solvent result in a precipitation of the resinoid.

While this invention is not limited as to the solvents which can be used, it is particularly adapted to the use and inclusion of high boiling solvents which remain in the final product, and such solvents and plasticizers can therefore be chosen as will impart plasticity and flexibility or other desirable qualities to the film or coating as well as render possible the advancement of the resinoid therein. A list of solvents for this purpose includes most of the well-known plasticizers particularly when used in relatively small amounts as the esters, diamyl-phthalate, ethyl abietate, etc., as well as many other compounds not generally classed as plasticizers such as oils, fatty acids, etc.; in fact any of the known non-resinous solvents are suitable for the purpose.

I claim:

1. Process of preparing a coating composition drying in air which comprises reacting an amido compound with an aldehyde in the presence of a solvent substantially to the gel point, arresting the reaction by dilution with solvent to form a solution having about 50 per cent solid content, and refluxing the solution until it shows a viscosity of 500 centipoises or more.

2. Process of preparing a coating composition drying in air by evaporation of solvent to a non-tacky film which comprises reacting an amido compound with an aldehyde in the presence of a solvent substantially to the gel point, arresting the reaction by dilution with a solvent and refluxing the solution until it shows a viscosity of at least 500 centipoises when adjusted to a solid content of 50 per cent.

3. Process of preparing a coating composition drying in air which comprises reacting a urea compound with an aldehyde in the presence of a solvent substantially to the gel point, arresting the reaction by dilution with solvent to form a solution having about 50 percent solid content, and refluxing the solution until it shows a viscosity of 500 centipoises or more.

4. Process of preparing a coating composition drying in air by evaporation of solvent to a non-tacky film which comprises reacting a urea compound with an aldehyde in the presence of a solvent substantially to the gel point, arresting the reaction by dilution with a solvent and refluxing the solution until it shows a viscosity of at least 500 centipoises when adjusted to a solid content of 50 percent.

HOWARD L. BENDER.